United States Patent [19]

Westberg

[11] 4,110,490
[45] Aug. 29, 1978

[54] METHODS FOR APPLYING MATERIAL TO THE END OF ELONGATE OBJECTS

[75] Inventor: Erik Westberg, Lidingo, Sweden
[73] Assignee: Aktiebolaget Tudor, Sundbyberg, Sweden
[21] Appl. No.: 676,624
[22] Filed: Apr. 13, 1976
[30] Foreign Application Priority Data
Apr. 23, 1975 [SE] Sweden .............................. 7504727
[51] Int. Cl.² ............................................ B23K 31/02
[52] U.S. Cl. .................................. 427/180; 118/423; 427/184; 427/284
[58] Field of Search ............... 427/180, 111, 105, 284; 118/DIG. 6, 13, 26, 28, 261, 423

[56] References Cited

U.S. PATENT DOCUMENTS

| 2,870,736 | 1/1959 | Pikal | 118/30 |
|---|---|---|---|
| 3,380,432 | 4/1968 | Hester et al. | 118/28 |
| 3,589,926 | 6/1971 | Eckert et al. | 118/423 |
| 3,594,211 | 11/1971 | Drum | 427/284 |

Primary Examiner—Ronald H. Smith
Assistant Examiner—Sadie L. Childs
Attorney, Agent, or Firm—Burns, Doane, Swecker & Mathis

[57] ABSTRACT

Stiffening material is applied to the end of an elongate battery electrode sheath by spreading the material onto a disc in the form of an apertured circle. The circle is continually rotated in a horizontal plane. The battery sheaths are oriented vertically and are displaced so that the lower end of each sheath is passed into the material at one location thereof such that the material approaches one side of the sheath. The sheath is then passed into the material at another location thereof spaced from the first location so that material approaches another side of the sheath.

5 Claims, 2 Drawing Figures

METHODS FOR APPLYING MATERIAL TO THE END OF ELONGATE OBJECTS

BACKGROUND AND OBJECTS

The present invention relates to the application of material to the ends of long objects. The objects may be rod-shaped or tube-shaped. The purpose of such treatment is, as a rule, the reinforcement of the end of the object. The method of the invention is especially suitable for reinforcing the end of tubes which are used as envelopes or sheaths for electrodes in electricity accumulators such as batteries.

In many cases, it is desirable to be able to reinforce the end of long objects. The purpose of this reinforcement may be to give the object higher end strength or greater durability with respect to other forms of mechanical influence. For example, it may be desired to apply a stiffening agent to the end of a battery electrode sheath. According to the methods known hitherto, this treatment has usually been carried out by means of intermittent immersion of the objects. In order to obtain an even and uniform treatment, however, it is desirable that the process be effected continuously and automatically.

The feeding and the bringing on of the material which is to be applied to the object require special arrangements whose description are not needed. The object of this invention is to make possible an even and uniform application of the material over the entire circumference of all the objects treated. According to the method of this invention, it is possible to achieve this end with the treatment of objects that move along a present course without rotating about their own axis.

BRIEF SUMMARY

These objects are achieved by the present invention which involves the application of a flowable material to the end of an object comprising the step of conducting the end of the object through a constantly moving field of the flowable material. More particularly, the material is spread into the form of an endless field such as an apertured circle. This field is continuously rotated in a horizontal plane. The lower end of the object is passed into the traveling material field at one location thereof such that the material approaches one side of the object end. The object end is then passed into the material field at another location thereof spaced from the first location such that the material approaches another side of the object end.

THE DRAWINGS

A preferred form of apparatus for carrying out the present invention is depicted in the accompanying drawings in which:

FIG. 1 is an elevational side view of such apparatus according to the invention; and FIG. 2 is a plan view of the apparatus.

DETAILED DESCRIPTION

Figure 1:
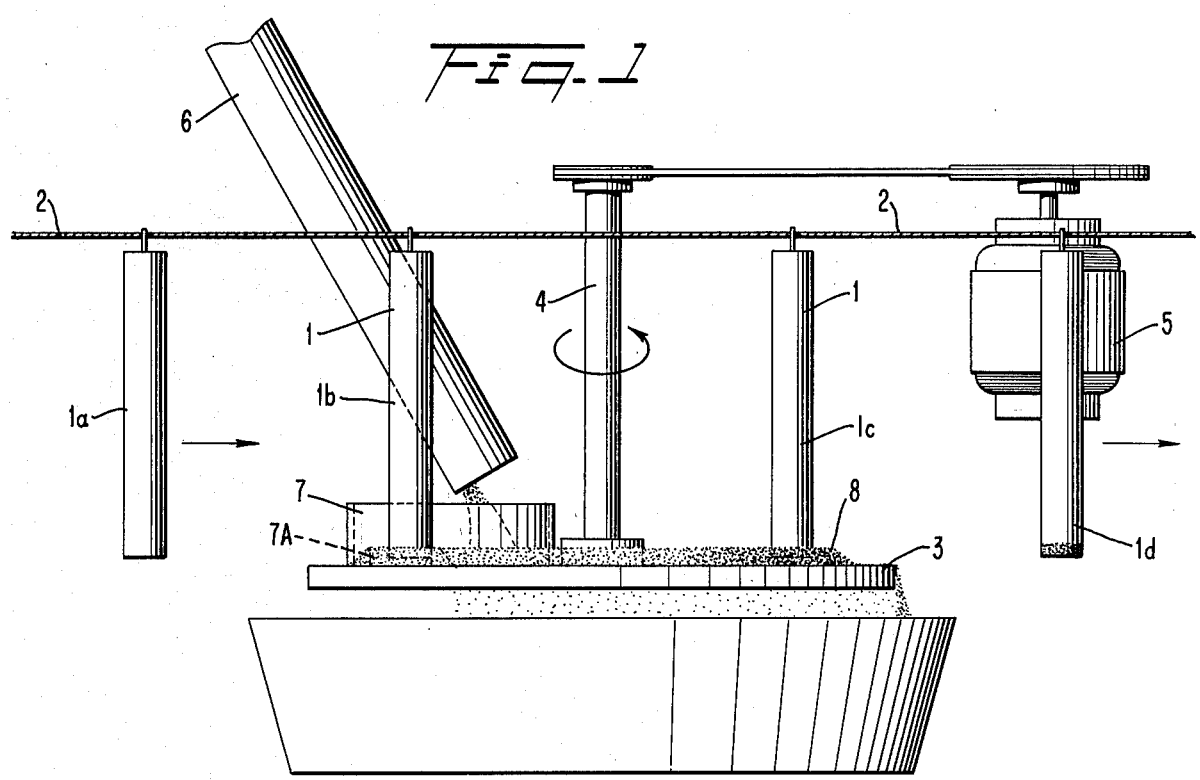
Figure 2:
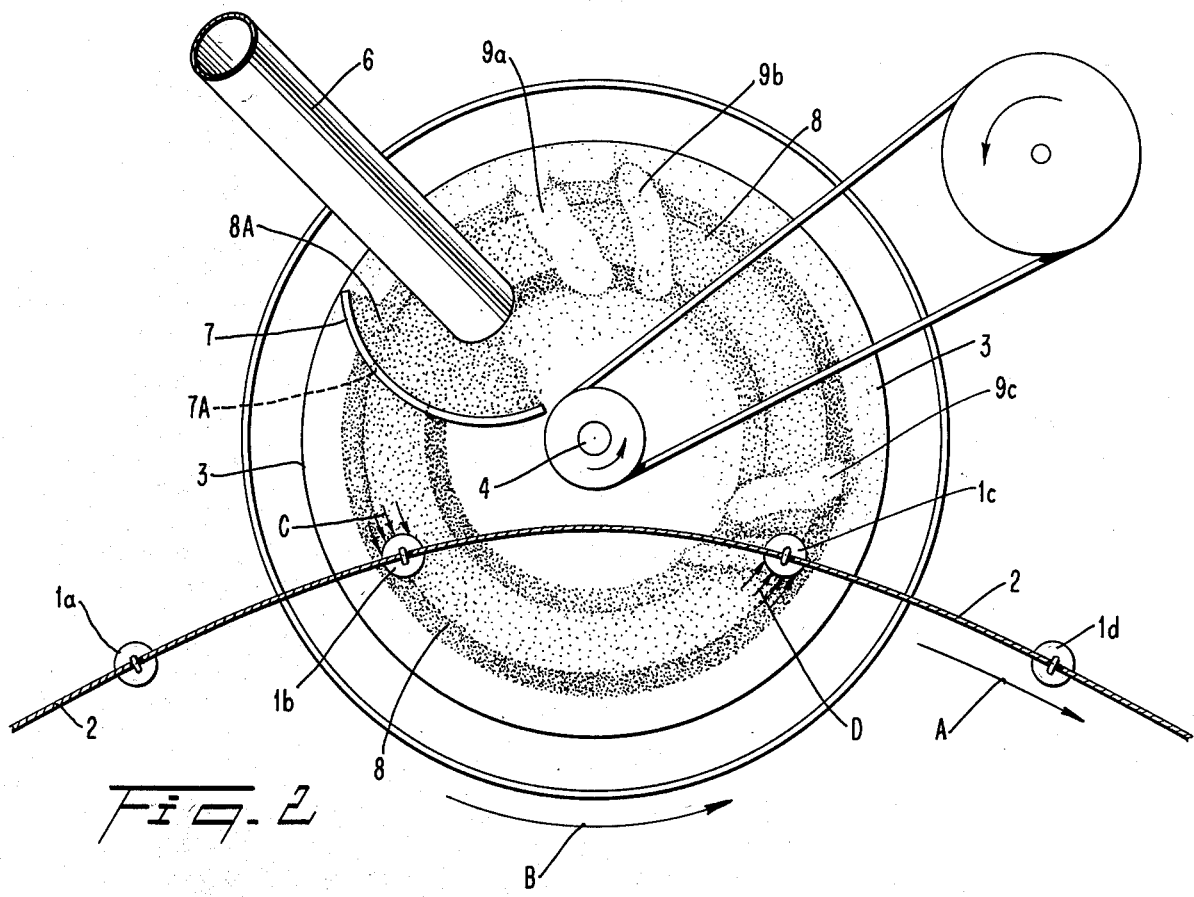

An arrangement according to the invention is shown in FIGS. 1 and 2 wherein elongate objects 1, such as battery electrode sheaths of cylindrical configuration, which are to be treated, follow a curved course which is indicated in FIG. 2. The curved direction of travel of the objects 1 has been indicated by an arrow A.

The objects may be supported for travel in any convenient fashion. For example, they may be hooked or clamped at their upper ends to a traveling cable 2 or other type of conveyor. The objects can be arranged to travel in a straight or curved path, as desired.

The material to be applied is supplied in flowable form such as a powder or liquid. The material is spread on a platform, such as a disk 3 rotating in direction B about a vertical axle 4. The disk 3 is operated by a motor 5 by means of pulleys and transmission belts in a conventional manner. The application material is supplied through a pipe 6 onto the disk. The material is moved by means of the disk's rotation against a stationary skimmer or scraper 7. The material passes through an opening 7A in the scraper and forms a field 8 preferably in the form of an endless field of predetermined thickness such as an apertured circle on the disk. Material is dispensed from the pipe 6 at a sufficient rate to maintain a build-up or reservoir 8A of material on the disk ahead of the scraper.

When the object 1 has passed through the material field 8, there develop tracks 9 in the latter. An object 1 which is to be treated first passes through the material field in the position marked 1b in FIG. 2. In this FIGURE small arrows C show how the material approaches and contacts one side of the object. Thereupon, the object moves into position 1c, while at the same time the disk rotates with a relative movement compared to that of the object, for example at a different speed. Thus, the track which is formed through the treatment of the object in position 1b is at the place indicated by 9c in FIG. 2, ahead of position 1c where the application of the other side of the object occurs. In position 1c, there occurs a second application of the material onto the object, which also here is indicated by arrows D. This time, the material travels toward and against the other side of the object.

The tracks or grooves 9a and 9d in the material field have been caused by the treatment of the object which now is in position 1d. These tracks will be replenished with material as that portion of the disk travels through the reservoir 8 of material.

It can be seen that the path of travel of the object intersects the path of travel of the material field at acute angles at both of the location 1b and 1c. Since the material approaches different sides of the object at these locations, it can be considered that the direction of travel of the object relative to that of the material is different at these locations.

The objects 1, which are mounted on the cable 2, pass through the material filled with the lower ends thereof spaced above the carrier disk 3 by a constant distance, as shown in FIG. 1. Thus, the objects are supported completely independently of the disk 3 as they travel through the material, and are maintained a substantially constant distance from the disk during travel through the first and second locations 1b, 1c.

It will be realized that neither the object to be treated nor the material to be applied needs to carry out any vertical movement as application is being made. Even and satisfactory application of the material around the entire circumference of the object is obtained by having the object pass through a constantly moving field of material in liquid or powder form. In order to ensure an even covering of the object around the entire circumference, the object passes twice through this field. The relative direction of the movement taken by the object in respect to the field varies with these two passings. The flowing material field is constantly replenished by the scraper to which a surplus of the material is conducted. In this way, it is brought about that each object passes through a field of unadulterated material, and the material supply is assured by having the two different passings take place at different places in the field. The material that is to be applied to the object may be in the form of powder or liquid. However, it must be so slow-flowing or viscous that a field of the material can be formed.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method of applying a flowable material to the ends of a series of elongate objects comprising the steps of:

spreading the material onto a carrier in the form of an endless field, continuously rotating the carrier and material, moving said end of each object through the material field by:

passing said object end through said material field at a first location in a direction laterally of a first direction of travel of said material at said first location, such that said material approaches one side of said object end, passing said object out of said material field, and passing said object end through said material field at a second location in a direction laterally of a second direction of travel of said material at said second location, said second direction of travel of said material being different than said first direction of travel in relation to said object so that said material approaches another side of said object end;

supporting each object completely independently of said carrier during travel of said object through said material to maintain the end of said object a substantially constant distance from said carrier during travel of said object through said material at said first and second locations, regulating the relative rate of travel between said object and said carrier so that a track formed in said field of material by said object passing therethrough at said first location is spaced from said second location during passage therethrough of said object.

2. A method according to claim 1 including the step of reviewing said material field at a third location intermediate said first and second locations by passing said material field through a reservoir of said material retained by a scraper, and passing said field beneath said scraper so that said field is of a predetermined thickness as it approaches said first location.

3. A method according to claim 1, wherein said spreading step comprises spreading the material onto a horizontally disposed table in the form of a circular field; and said continuously rotating step comprises continuously rotating said table about a vertical axis.

4. A method according to claim 3, wherein said moving step comprises orienting said objects vertically, and mounting said objects on a conveying member which carries the lower ends of said objects through said material field.

5. A method according to claim 1, wherein said material is applied to the ends of cylindrical members which comprise said objects.

* * * * *